July 11, 1933.  J. A. BARR  1,917,819
PROCESS AND APPARATUS FOR REMOVING SOLIDS FROM LIQUIDS
Filed Aug. 29, 1930
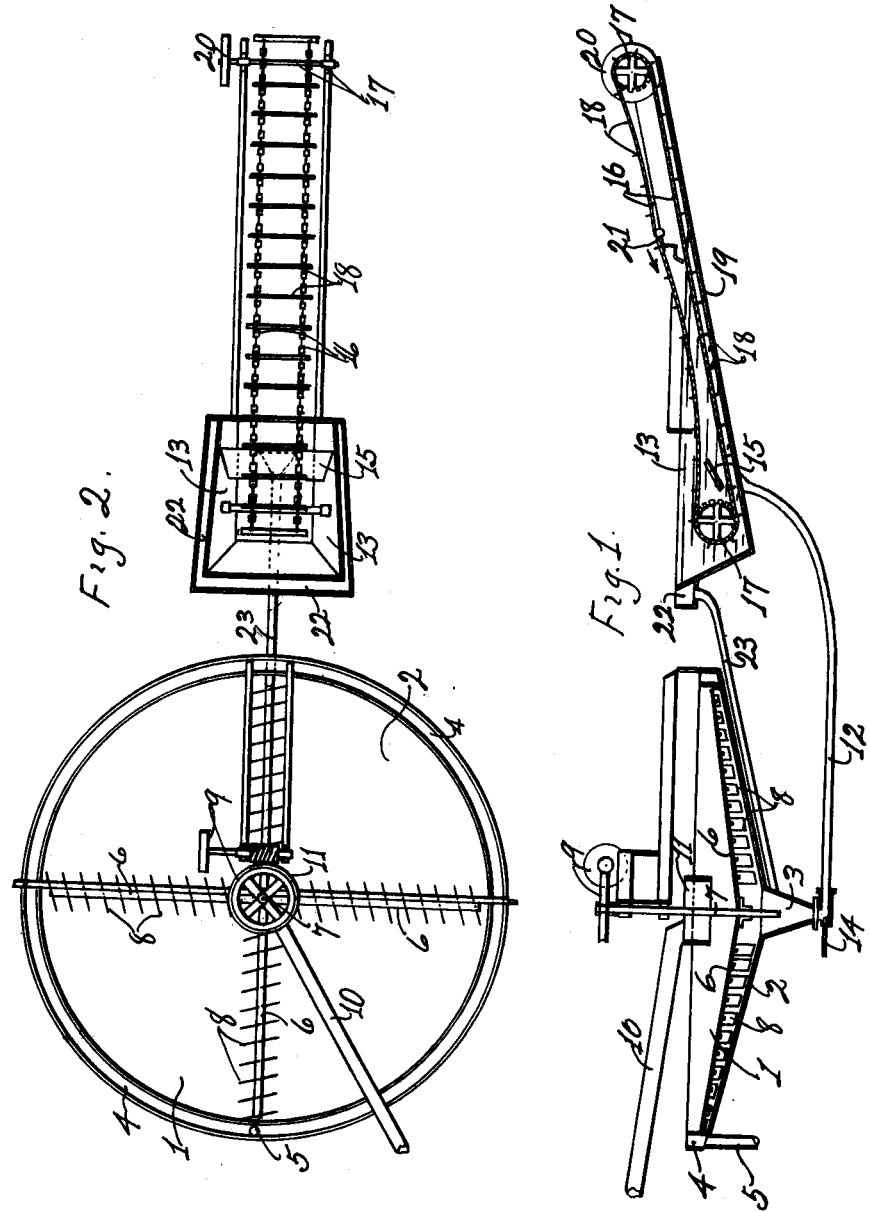
Inventor
James A. Barr
By his Attorneys
Gifford, Scull & Burgess Patented July 11, 1933

1,917,819

UNITED STATES PATENT OFFICE

JAMES A. BARR, OF MOUNTPLEASANT, TENNESSEE, ASSIGNOR TO INTERNATIONAL AGRICULTURAL CORPORATION, OF NEW YORK, N. Y., A CORPORATION OF NEW YORK

PROCESS AND APPARATUS FOR REMOVING SOLIDS FROM LIQUIDS

Application filed August 29, 1930. Serial No. 478,590.

This invention relates to a process and apparatus by means of which a liquid carrying solids in suspension can be treated with the result that the more rapidly settling solids settle out and may be washed. The liquid which may carry off other constituents, is removed and may be collected after the more rapidly settling solids have been separated. The invention is especially applicable to slimy feed consisting of water and crushed material, such as phosphate, etc., but it is not restricted to this particular use.

In carrying out the invention, a liquid carrying slime and granular material is passed into a settling chamber where the more rapidly settling particles of granular material settle and accumulate and are removed through the bottom while the liquid overflowing at the top carries away the slower settling particles of granular material and soluble constituents. The material which settles is forced together with some of the liquid into a second settling chamber having a liquid level higher than the first one, where coarser particles are washed to remove finer particles and soluble constituents. Overflow from the second settling chamber is caused to enter the bottom of the first chamber by gravity and pass upwardly countercurrent to the descending particles in said first chamber.

The invention will be understood from the description in connection with the accompanying drawings, in which Fig. 1 is a vertical section through an illustrative embodiment of the invention, and Fig. 2 is a plan view of the same.

In the drawing, reference character 1 indicates a tank which may be a circular chamber or container having a bottom 2 that slopes toward the outlet 3. The chamber or container 1 is provided with a trough 4 around its outer periphery from which trough an overflow pipe 5 leads away. A stirring device is provided in the chamber 1 comprising arms 6 driven by a shaft 7 and carrying scrapers 8 that are placed at such an angle that they cause the particles that settle upon the bottom 2 of the container to pass into the outlet 3 when the stirrer is revolved. The shaft 7 may be driven by any convenient driving mechanism, as indicated, for example, at 9. A feed inlet 10 that discharges into a short cylinder 11 at the center of the chamber 1 may be provided.

A pipe 12 leads from the lower end of the outlet 3 into a second settling chamber or container 13. A jet 14 or other convenient means may be utilized for forcing the materials that pass to the lower portion of the outlet 3 to pass through the pipe 12 into the chamber or container 13 preferably beneath the inclined baffle 15 in said compartment.

The chamber 13 is provided with means for removing settled particles. This means may, for example, be a rake 16 of the chain type passing over rollers 17. The rake 16 has cross bars 18 that rake the solid material upwardly along the inclined floor 19 of the container 13. The upper roller 17 may be driven in any convenient way by means of the gear or pulley 20.

A wash liquid, such as water, acid, alkaline or gas bearing solutions, etc. is introduced into the chamber 13. For this purpose, a pipe 21 is provided preferably above the normal water level in the chamber 13 and an overflow trough 22 is provided around three sides of the chamber 13. A pipe 23 extends from the trough 22 into the lower portion of the chamber 1.

The operation is as follows: The pulp or feed passes through the pipe 10 into the chamber 1 where the heavier particles settle and the lighter particles and soluble constituents overflow with liquid into the trough 4 and thence out through the outlet pipe 5. The blades 8 of the rake cause the solid particles to pass into the outlet 3 from which the jet 14 forces them with some of the liquid through the pipe 12 into the chamber 13, where solid particles settle and are dragged upwardly along the sloping floor 19 and finally entirely outside of the chamber 13. While the solid particles are passing under the pipe 21, they are washed by the liquid entering through this pipe. Liquid passes downwardly and finally over the overflow edges of the chamber 13 into the trough 22 carrying along suspended particles and soluble constituents. It then passes through the pipe 23 into the upper portion of the outlet 3 and upwardly in countercurrent direction to the solid particles that are descending in the chamber 1.

The chamber 13 has been described as being located at a higher level than the chamber 1, so that the overflow from the chamber 13 will pass to the chamber 1 by gravity, but the chamber 13 may be located below the chamber 1 and the overflow from it pumped into the lower portion of outlet 3 and pass in countercurrent direction to the particles settling in chamber 1.

I claim:

1. The process which comprises introducing a mixture of liquid and solid particles into a first settling zone, where slow settling particles rise and overflow and where fast settling particles settle out and pass into a smaller consolidating zone where said fast settling particles collect as a column of relatively dense pulp, removing a regulated quantity of said settled particles from said column with a relatively small amount of liquid, transferring it into a second settling zone, and returning the overflow from said second zone to the upper portion of said smaller zone at a point above said relatively dense column of pulp.

2. The process which comprises introducing a mixture of liquid and solid particles into a first settling zone, where slow settling particles rise and overflow and where fast settling particles settle out and pass into a smaller consolidating zone where said fast settling particles collect as a column of relatively dense pulp, removing a regulated quantity of said settled particles from said column with a relatively small amount of liquid, transferring it into a second settling zone, and returning the overflow from said second zone to the upper portion of said smaller zone at a point above said relatively dense column of pulp while adding fresh liquid to said second zone.

3. The process which comprises introducing a mixture of liquid and solid particles into a first settling zone, where slow settling particles rise and overflow and where fast settling particles settle out and pass into a smaller consolidating zone whereof said fast settling particles collect as a column of relatively dense pulp, removing a regulated quantity of said settled particles from said column with a relatively small amount of liquid, transferring it into a second settling zone, returning the overflow from said second zone to the upper portion of said smaller zone at a point above said relatively dense column of pulp, and maintaining a relatively quiet and non-countercurrent condition within said column.

4. The process which comprises introducing a mixture of liquid and solid particles into a first settling zone, where slow settling particles rise and overflow and where fast settling particles settle out and pass into a smaller consolidating zone in which said fast settling particles collect in a relatively dense column of pulp under relatively quiet non-countercurrent conditions, removing a regulated amount of particles from the lower portion of said column with a relatively small amount of liquid, passing it into a second settling zone at a higher liquid level than in the first named settling zone, removing fast settling particles from said second zone, and returning the overflow from said second zone into the upper portion of said smaller zone at a point above the relatively dense column of pulp, while adding fresh liquid to said second zone.

5. In combination, a settling tank, a smaller vertically elongated settling tank communicating with said settling tank, a second settling tank, means for passing solids from said smaller tank into said second settling tank, means for passing overflow from said second settling tank to the upper portion of said smaller tank, and means for washing and removing solids from said second settling tank.

JAMES A. BARR.